US012509650B1

(12) United States Patent
Wang et al.

(10) Patent No.: US 12,509,650 B1
(45) Date of Patent: Dec. 30, 2025

(54) WATER-ONLY LAUNDRY DETERGENT SHEET AND PREPARATION METHOD THEREOF

(71) Applicant: Foshan City Magic Crystal Technology Development Co., Ltd., Guangdong (CN)

(72) Inventors: Fengsheng Wang, Foshan (CN); Chiseng Wong, Foshan (CN); Jiyuan Wu, Foshan (CN); Yuzhuo Lin, Foshan (CN); Jianhua Zhang, Foshan (CN)

(73) Assignee: FOSHAN CITY MAGIC CRYSTAL TECHNOLOGY DEVELOPMENT CO., LTD., Foshan (CN)

( * ) Notice: Subject to any disclaimer, the term of this patent is extended or adjusted under 35 U.S.C. 154(b) by 0 days.

(21) Appl. No.: 19/183,324

(22) Filed: Apr. 18, 2025

(30) Foreign Application Priority Data

Dec. 31, 2024 (CN) ......................... 202411993760.7

(51) Int. Cl.
*C11D 17/06* (2006.01)
*C11D 1/86* (2006.01)
*C11D 3/10* (2006.01)
*C11D 3/386* (2006.01)
(Continued)

(52) U.S. Cl.
CPC ................ *C11D 17/06* (2013.01); *C11D 1/86* (2013.01); *C11D 11/00* (2013.01)

(58) Field of Classification Search
None
See application file for complete search history.

(56) References Cited

U.S. PATENT DOCUMENTS

2009/0232873 A1* 9/2009 Glenn, Jr. ............ A61K 8/0208 424/443
2020/0277555 A1* 9/2020 Cho ..................... C11D 3/3753
(Continued)

FOREIGN PATENT DOCUMENTS

CN 205803432 U 12/2016
CN 106833934 B 4/2020

OTHER PUBLICATIONS

KR 101787652 (Year: 2017).*

*Primary Examiner* — Lorna M Douyon
(74) *Attorney, Agent, or Firm* — Maier & Maier, PLLC

(57) ABSTRACT

A water-only laundry detergent sheet and preparation method thereof. The raw materials for preparing the laundry detergent sheet includes surfactant, water and additives. The laundry detergent sheet contains bubbles, and Plateau channels are formed between the bubbles, a volume proportion of the bubbles is 50-90%. The water-only laundry detergent sheet adjusts a volume proportion of bubbles, and the bubbles can increase a specific surface area of the laundry detergent sheet and enlarge a contact area with water. Plateau channels can be formed between the bubbles, and these Plateau channels have the effect of capillaries. When the laundry detergent sheet is placed in water, water can enter an interior of the laundry detergent sheet along the Plateau channels, thereby accelerating the dissolution of the laundry detergent sheet, thereby achieving a quick-dissolving effect under low temperature conditions, so that the laundry detergent sheet can better exert a decontamination effect.

8 Claims, 1 Drawing Sheet

(51) Int. Cl.
*C11D 3/50* (2006.01)
*C11D 11/00* (2006.01)

(56) References Cited

U.S. PATENT DOCUMENTS

2021/0163698 A1* 6/2021 Mac Namara ......... C11D 17/06
2021/0261892 A1* 8/2021 Xu ......................... C11D 1/835

* cited by examiner

WATER-ONLY LAUNDRY DETERGENT SHEET AND PREPARATION METHOD THEREOF

CROSS-REFERENCE TO RELATED APPLICATIONS

The application claims priority to Chinese Patent Application No. 202411993760.7, filed on Dec. 31, 2024, the content of all of which is incorporated herein by reference.

FIELD

The present disclosure relates to the technical field of washing products, and in particular to a water-only laundry detergent sheet and a preparation method thereof.

BACKGROUND

Laundry detergent sheets have gained popularity among consumers due to convenience in carrying and transportation. During use, the laundry detergent sheet is placed into the washing machine along with clothes, and after water is added, the laundry detergent sheet dissolves and releases cleaning agents to wash the clothes. To ensure rapid dissolution, laundry detergent sheets are typically made from water-soluble materials. However, during the manufacturing process, the laundry detergent sheets are often formed through calendering, which results in a highly compacted structure and a reduced surface area exposed to water, thereby slowing down the dissolution rate. The issue becomes more pronounced in low-temperature water, where the dissolution rate significantly decreases. In some cases, the laundry detergent sheets may not fully dissolve even after the first wash cycle, leading to diminished stain removal performance.

It can be seen that the existing technology still needs to be improved and developed.

SUMMARY

In view of the above-mentioned deficiencies in the prior art, the object of the present disclosure is to provide a water-only laundry detergent sheet and a preparation method thereof, aiming to solve the defect that the existing laundry detergent sheets have a slow dissolution rate under low temperature conditions, resulting in insufficient decontamination effect.

In order to achieve the above object, the present disclosure adopts the following technical solutions:

A water-only laundry detergent sheet, and raw materials for preparing the laundry detergent sheet include: a surfactant, water and additives; the laundry detergent sheet contains bubbles, and Plateau channels are formed between the bubbles; a volume proportion of the bubbles is 50-90%.

In the water-only laundry detergent sheet, the volume proportion of the bubbles is 70-85%.

In the water-only laundry detergent sheet, a diameter of each bubble is 10-1500 μm.

In the water-only laundry detergent sheet, a curvature radius of each Plateau channel is 10-1500 km.

In the water-only laundry detergent sheet, by weight percentage, the raw materials include: 29-70% surfactant, 29-70% water and 1-40% additives.

In the water-only laundry detergent sheet, the surfactant includes: anionic surfactant, cationic surfactant and nonionic surfactant.

In the water-only laundry detergent sheet, by weight percentage, the surfactant includes: 49-99% anionic surfactant, 0.01-5% cationic surfactant, and 0.01-50% nonionic surfactant.

In the water-only laundry detergent sheet, by weight percentage, the raw materials for preparing the laundry detergent sheet include: 60% surfactant, 37% water and 3% additives; and the surfactant includes, by weight percentage, 80% anionic surfactant, 1% cationic surfactant and 19% nonionic surfactant.

A preparation method of a water-only laundry detergent sheet, used for preparing the water-only laundry detergent sheet as described above, the method includes steps of: stirring additives and water to achieve a uniform mixture, and heating until completely dissolved; adding a surfactant, and stirring until completely dissolved; foaming, measuring viscosity of system, and after the viscosity meets a requirement, drying and tableting to obtain the water-only laundry detergent sheet.

In the preparation method of the water-only laundry detergent sheet, in the step of measuring viscosity, a viscosity of system meeting the requirement is: at 40-85° C., the viscosity is 2000-30000 mPa·s.

Beneficial Effects:

The present disclosure provides a water-only laundry detergent sheet and a preparation method thereof. The water-only laundry detergent sheet adjusts a volume proportion of bubbles, and the bubbles can increase a specific surface area of the laundry detergent sheet and enlarge a contact area with water. Plateau channels can be formed between the bubbles, and these Plateau channels have the effect of capillaries. When the laundry detergent sheet is placed in water, water can enter an interior of the laundry detergent sheet along the Plateau channels, thereby accelerating the dissolution of the laundry detergent sheet, thereby achieving a quick-dissolving effect under low temperature conditions, so that the laundry detergent sheet can better exert a decontamination effect.

The preparation method of the laundry detergent sheet increases the volume proportion of the bubbles by adjusting composition and proportion of the surfactant, while making the formed bubbles have better strength, avoiding bubble rupture or coalescence, thereby facilitating a formation of more Plateau channels and accelerating a dissolution rate of the laundry detergent sheet.

DETAILED DESCRIPTION OF EMBODIMENTS

Figure 1:
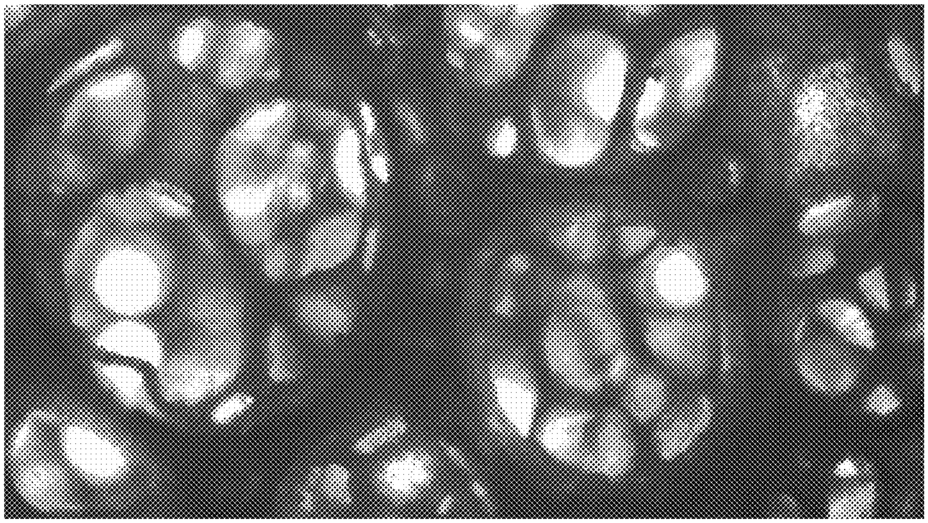
FIG. 1 is an enlarged view of the water-only laundry detergent sheet described in embodiment 1 under a microscope according to the present disclosure.

The present disclosure provides a water-only laundry detergent sheet and a preparation method thereof. In order to make the purpose, technical solutions and effect of the present disclosure clearer and more specific, the present disclosure is further described in detail by following embodiments. It should be understood that the embodiments described herein are only used to explain the present disclosure and are not used to limit the present disclosure.

The present disclosure provides a water-only laundry detergent sheet. Raw materials for preparing the laundry detergent sheet include: a surfactant, water and additives.

The surfactant is used for removing stains from clothes and has a decontamination effect. The water is used as a solvent, and the surfactant and the additives can be fully mixed in the water to form a viscous mixture during preparation, so as to form microbubbles. The additives include one of or a combination of a fragrance raw material, a foaming agent (such as sodium carbonate or sodium bicarbonate), an enzyme preparation, an antibacterial agent, a thickener, and a filler. However, the additives are not limited to these ingredients, and can also be other additives with special functional effects. By adding the additives, the laundry detergent sheet can have corresponding functions. For example, by adding essence or other fragrance raw materials, the laundry detergent sheet may have a fragrance-enhancing effect; by adding a certain enzyme preparation, the laundry detergent sheet may have an enzymatic hydrolysis function, and the decontamination effect may be further increased; by adding the antibacterial agent, the laundry detergent sheet may have an antibacterial effect, and so on. By adding the additives, the laundry detergent sheet can have specific functions. In the implementation process, the corresponding additives can be selected according to actual needs. Since the ingredients used to prepare the laundry detergent sheet are completely soluble in water, the laundry detergent sheet can be completely dissolved in water during use. And after the laundry detergent sheet is dissolved in water, the water appears clear without turbidity, thus avoiding a situation where residual powder adheres to surfaces of clothes to form spots, which is a characteristic of a water-only laundry detergent sheet.

In the present disclosure, in order to solve the problem that the laundry detergent sheet is difficult to dissolve under low temperature conditions, bubbles are contained in the laundry detergent sheet. The bubbles can increase a specific surface area of the laundry detergent sheet, increase the contact area between the laundry detergent sheet and water, and Plateau channels can be formed between the bubbles, such as among three adjacent bubbles. The Plateau channels have a capillary effect. When the laundry detergent sheet is placed in water, the water can penetrate into the laundry detergent sheet along the Plateau channels, thereby promoting a rapid disintegration of the laundry detergent sheet, so that the disintegration time of the laundry detergent sheet in the water can be less than 45 seconds under low temperature conditions. Therefore, the effective ingredients in the laundry detergent sheet can quickly play a role and have a better decontamination effect.

Since the Plateau channels are formed between the bubbles, when the proportion of the bubbles is higher, more Plateau channels are formed, and the Plateau channels are easy to connect with each other, which accelerates the dissolution of the laundry detergent sheets. Especially when the bubble diameter is small, more Plateau channels are formed and are interconnected, which greatly accelerates the dissolution of the laundry detergent sheets. Therefore, in order to better form the Plateau channels, it is necessary to increase the volume proportion of the bubbles to be over 50%, such as 50-60%, 50-70%, 70-80%, 80-90%, thereby increasing the Plateau channels in the laundry detergent sheet.

However, when the volume proportion of the bubbles is high, the effective ingredients per unit volume of the laundry detergent sheets will decrease. And if the volume proportion of the bubbles is too high, it is easy for the bubbles to rupture or coalesce to form a large bubble, which is detrimental to the formation of the Plateau channels. In addition, the diameter of the bubbles also affects the formation of the Plateau channels or a radius of the Plateau channels. Through research, it is found that when the volume proportion of the bubbles is fixed, the larger the diameter of the bubbles, the larger a curvature radius of the formed Plateau channels, which is easy to cause bubbles to coalesce and form large bubbles, causing the number of the Plateau channels to decrease. On the other hand, the smaller the radius of the bubbles, the more Plateau channels are formed, and the curvature radius of the Plateau channels will be smaller, and they are easy to connect with each other, forming a capillary phenomenon, which can make the water diffuse quickly and accelerate the dissolution of the laundry detergent sheets.

In some embodiments, the diameters of the bubbles can be 10-1500 μm, and Plateau channels with the curvature radii of 10-1500 μm can be formed. For example, the diameters of the bubbles are 10-100 μm, 100-300 μm, 300-800 μm, 600-1000 μm, or 1000-1500 μm, and the Plateau channels with the curvature radii of 10-100 μm, 100-300 μm, 300-800 am, 600-1000 am, or 1000-1500 μm can be formed, which facilitates water infiltration and accelerates the dissolution of the laundry detergent sheet.

In some embodiments, in the laundry detergent sheets, when the volume proportion of the bubbles is 70-85% and the diameter of the bubbles is 300-800 am, the bubbles are stacked together to form Plateau channels with a curvature radius of 300-800 am. Because the volume proportion of the bubbles is high, the Plateau channels are interconnected and can infiltrate water more quickly, accelerating the dissolution of the laundry detergent sheet. In addition, during preparation, the bubbles with the volume proportion and diameter are difficult to rupture or coalesce and are relatively stable.

In an embodiment, the raw materials for preparing the laundry detergent sheet include, by weight percentage: 29-70% surfactant, 29-70% water and 1-40% additives. The ratio of the raw materials has a better decontamination effect and can stabilize the formed the bubbles so as to obtain the Plateau channels.

In some embodiments, the surfactant includes anionic surfactant, cationic surfactant and nonionic surfactant, and the anionic surfactant includes the anionic surfactants commonly used in laundry detergent sheets such as sodium n-octyl sulfate, linear sodium dodecylbenzene sulfonate and sodium 3-allyloxy-2-hydroxy-1-propane sulfonate; the cationic surfactant includes quaternary ammonium salt, fatty amine, amine oxide, and cetyltrimethylammonium bromide; the nonionic surfactant includes polyoxyethylene nonionic surfactant, fatty acid methyl ester ethoxylate, fatty acid glyceride, and polyol type, through the compounding of various types of surfactants, it can have better detergency. Through a combination of different kinds of the surfactants, better decontamination effect can be achieved and overall hydrophilic-lipophilic balance value of the surfactant can be adjusted. In addition, the addition of cationic surfactants and nonionic surfactants can make a strength of microbubbles higher, which results in that even the volume proportion of bubbles is high, and the bubbles are stacked very tightly, the bubbles would not coalesce, which is equivalent to promoting the formation of microbubbles.

However, an amount of cationic surfactant added should not be too high, as too much cationic surfactant will affect the decontamination effect of anionic surfactants, and on the other hand, too little cationic surfactant will affect the mechanical strength of the bubbles. Through comparison experiments, it was found that under the condition of keeping other components and proportions unchanged, replacing all cationic surfactants and nonionic surfactants with anionic surfactants would result in larger bubble diameter during the preparation process, even if the amount of injected bubbles is the same, that is, the same volume proportion of the bubbles. And the larger bubble diameter makes the bubbles more prone to rupture or uneven distribution, resulting in a decrease in the number of the Plateau channels, which is detrimental to the dissolution of the laundry detergent sheet. In this regard, in an embodiment, the surfactant includes, by weight percentage: 49-99% anionic surfactant, 0.01-5% cationic surfactant, and 0.01-49% nonionic surfactant, the surfactant in the above composition ratio has a better decontamination effect, and can form bubbles with higher strength. During preparation, microbubbles can be formed by injecting air and stirring at high speed.

In an embodiment, the raw materials for preparing the laundry detergent sheet include, by weight percentage, 60% surfactant, 37% water and 3% additives. The surfactant includes, by weight percentage, 80% anionic surfactant, 1% cationic surfactant and 19% nonionic surfactant. The laundry detergent sheet in the above composition ratio has a good decontamination effect. Due to a special proportion of the anionic surfactant, the cationic surfactant and the nonionic surfactant, while obtaining a more suitable hydrophilic-lipophilic balance value, the viscosity of the system when melted can be within a reasonable range, thereby preventing the overflow and bursting of the bubbles and forming microbubbles.

The second aspect of the present disclosure also provides a preparation method of water-only laundry detergent sheet, which is used to prepare the water-only laundry detergent sheet as described above, and the method includes steps of: stirring the additives and the water to achieve a uniform mixture, and heating until completely dissolved; adding an anionic surfactant, stirring until completely dissolved; adding a nonionic surfactant, stirring until completely dissolved, and cooling to 40-60° C.; adding a cationic surfactant, fully foaming, measuring the viscosity, and drying and tableting after the viscosity is qualified to obtain the water-only laundry detergent sheet.

In the aforementioned preparation method, the step of fully foaming is: injecting air during the stirring process, stirring and shearing at high speed to form microbubbles to achieve the foaming effect; or, adding a foaming agent and decomposing the foaming agent a specific temperature to generate bubbles.

During preparation, in the step of fully foaming, the injection of air can change the viscosity and apparent density of the system. Therefore, the foaming condition of the system can be judged by measuring the viscosity or apparent density of the system, that is, the volume proportion of the bubbles in the system can be understood. Through research, it is found that at 40-85° C., when the viscosity of the system is 2000-30000 mPa·s, the volume proportion of bubbles is 50-90%; when the temperature of the system is 55° C. and the viscosity is 5000-10000 mPa·s, the volume proportion of bubbles is 70-85%. Therefore, by measuring the viscosity of the system at a specific temperature, it is possible to determine whether the volume proportion of the bubbles meets the standard.

To further illustrate the water-only laundry detergent sheet and preparation method thereof provided by the present disclosure, the following embodiments are provided.

Embodiment 1

The water-only laundry detergent sheets were prepared by: acquiring, by weight percentage, 60% of surfactant, 37% of water and 3% of additives, and the surfactant is composed of: 80% of anionic surfactant, 1% of cationic surfactant and 19% of nonionic surfactant.

Figure 2:
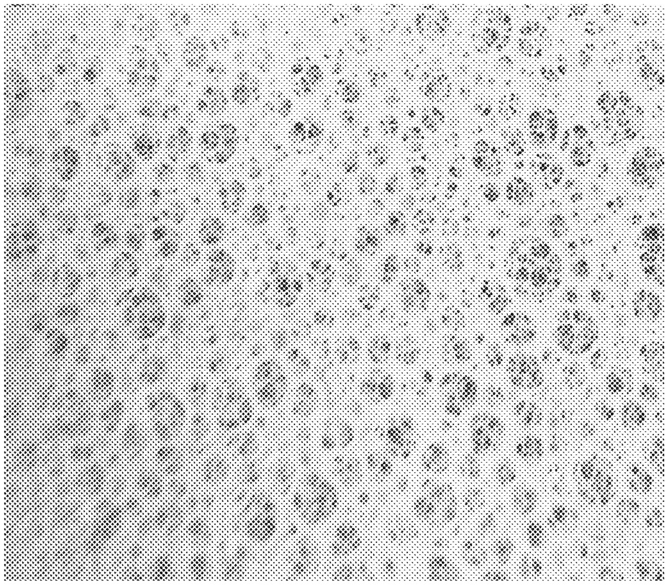
FIG. 2 is a physical picture of the water-only laundry detergent sheet described in Embodiment 1.

Stirring the additives and the water to achieve a uniform mixture, raising the temperature until completely dissolved; adding anionic surfactant, stirring until completely dissolved; adding nonionic surfactant, stir until completely dissolved, and cooling to 55° C.; adding cationic surfactant, fully foaming, and when the viscosity of the system is measured to be 7520 mPa·s (the system temperature is 55° C. at this time), stopping foaming, and then tableting and drying to obtain water-only laundry detergent sheets (the surfaces of the laundry detergent sheets under a microscope are shown in FIG. 1, and the actual picture is shown in FIG. 2).

Embodiment 2

The water-only laundry detergent sheets were prepared by the steps basically the same as Embodiment 1, except that: (1) the raw materials for preparing the water-only laundry detergent sheets were: 29% surfactant, 31% water and 40% additives; (2) when stopping foaming, the viscosity of the system is 12600 mPa·s.

Embodiment 3

The water-only laundry detergent sheets were prepared by the steps basically the same as Embodiment 1, except that: (1) the raw materials for preparing the water-only laundry detergent sheets were: 70% surfactant, 29% water and 1% additives; (2) when stopping foaming, the viscosity of the system is 5100 mPa·s.

Embodiment 4

The water-only laundry detergent sheets were prepared by the steps basically the same as Embodiment 1, except that: (1) the raw materials for preparing the water-only laundry detergent sheets were: 29% surfactant, 70% water and 1% additives; (2) when stopping foaming, the viscosity of the system is 9820 mPa·s.

Embodiment 5

The water-only laundry detergent sheets were prepared by the steps basically the same as Embodiment 1, except that: (1) the surfactant was composed of: 99% anionic surfactant, 0.01% cationic surfactant, and 0.99% nonionic surfactant; (2) when stopping foaming, the viscosity of the system is 14600 mPa·s.

Embodiment 6

The water-only laundry detergent sheets were prepared by the steps basically the same as Embodiment 1, except that: (1) the surfactant was composed of: 50% anionic surfactant, 5% cationic surfactant, and 45% nonionic surfactant; (2) when stopping foaming, the viscosity of the system is 9290 mPa·s.

Embodiment 7

The water-only laundry detergent sheets were prepared by the steps basically the same as Embodiment 1, except that: (1) the surfactant was composed of: 49% anionic surfactant, 1% cationic surfactant, and 50% nonionic surfactant; (2) when stopping foaming, the viscosity of the system is 8810 mPa·s.

Embodiment 8

The water-only laundry detergent sheets were prepared by the steps basically the same as Embodiment 1, except that: (1) the surfactant was composed of: 94.99% anionic surfactant, 5% cationic surfactant, and 0.01% nonionic surfactant; (2) when stopping foaming, the viscosity of the system is 7850 mPa·s.

Comparative Example 1

The water-only laundry detergent sheets were prepared by the steps basically the same as Embodiment 1, except that in the preparation process, after the cationic surfactant is added, tableting and subsequent steps are directly performed without foaming.

Comparative Example 2

The water-only laundry detergent sheets were prepared by the steps basically the same as Embodiment 1, except that the air injection volume accounts for 30% of the volume of the system, and after the foaming is completed, the viscosity of the system is 45200 mPa·s.

It should be noted that in all the embodiments, the ingredients of the additives are the same, consisting of 30 wt % of fragrance, 30 wt % of softener and 40 wt % of enzyme preparation.

Performance Testing (1) The volume proportion of bubbles, average diameters of the bubbles and the curvature radii of the Plateau channels of the water-only laundry detergent sheets prepared in Embodiments 1-6 and the water-only laundry detergent sheets prepared in Comparative Examples 1-2 were tested. When testing the average diameters of the bubbles and the average curvature radii of the Plateau channels, 10 bubbles or Plateau channels were randomly selected for testing, and the average value was calculated. The test results are shown in Table 1.

(2) The performance tests of the water-only laundry detergent sheets prepared in Embodiments 1-6 and the water-only laundry detergent sheets prepared in Comparative Examples 1-2 were conducted, including detergency test and dissolution rate test. The test results are shown in Table 1. The test method is:

Detergency test: According to GB/T 13174-2021 "Determination of Detergency and Cycle Washing Performance of Detergents for Clothes", the test specimens were JB-01 dirty cloth, JB-02 dirty cloth, and JB-03 dirty cloth, and the detergency ratio Pi of the detergent sheet was obtained, where Pi≥1.0 was qualified and <1.0 was unqualified.

Dissolution rate: Placing a 11 cm*14 cm*1 mm laundry detergent sheet in 1 L of water at 5° C. and measuring the dissolution time.

TABLE 1

Performance test results

| | Volume proportion of bubbles (%) | Diameter of bubbles (μm) | Curvature radius of Plateau channels (μm) | Dissolution time (s) | Decontamination ratio JB-01 dirty cloth | Decontamination ratio JB-02 dirty cloth | Decontamination ratio JB-03 dirty cloth |
|---|---|---|---|---|---|---|---|
| Embodiment 1 | 80 | 500 | 510 | 7 | 1.2 | 1.21 | 1.15 |
| Embodiment 2 | 64 | 450 | 455 | 30 | 1.05 | 1.8 | 1.03 |
| Embodiment 3 | 90 | 410 | 420 | 5 | 1.15 | 1.16 | 1.16 |
| Embodiment 4 | 70 | 480 | 480 | 28 | 1.01 | 1.02 | 1.05 |
| Embodiment 5 | 50 | 1450 | 1465 | 45 | 1.08 | 1.05 | 1.09 |
| Embodiment 6 | 72 | 12 | 13 | 14 | 1.32 | 1.21 | 1.38 |
| Embodiment 7 | 74 | 15 | 16 | 12 | 1.22 | 1.14 | 1.12 |
| Embodiment 8 | 78 | 1100 | 1150 | 26 | 1.18 | 1.01 | 1.11 |
| Comparative example 1 | Not foaming | / | / | >120 | 0.99 | 0.95 | 0.92 |
| Comparative example 2 | 30 | 510 | 2060 | >120 | 1.02 | 0.99 | 0.96 |

As shown in Table 1, the dissolution time of Embodiments 1-8 is within 45 s, and as the volume proportion of the bubbles increases, the dissolution time decreases, that is, the dissolution rate of the laundry detergent sheets increases as the volume proportion of the bubbles increases. When the volume proportion of the bubbles is as high as 90%, the dissolution rate is as fast as 5 s. At the same time, as shown in Embodiments 5-8, the amount of cationic surfactant and nonionic surfactant adopted affects the diameter of the bubbles. When the amount of both is small, the diameter of the bubbles increases, which leads to a decrease in the number of the Plateau channels and a decrease in the dissolution rate.

Comparative Example 1 was not foamed, so no Plateau channels could be formed, resulting in a long dissolution time, and ultimately poor decontamination effect. The volume proportion of the bubbles of Comparative Example 2 was less than 50%, and the distance between the bubbles was large, resulting in a large curvature radius of the formed the Plateau channels, which could not be connected to each other, and ultimately took a long time to dissolve.

It is understandable that those skilled in the art can make equivalent substitutions or changes based on the technical solution and inventive concept of the present disclosure, and all these substitutions or changes should fall within the protection scope of the claims attached to the present disclosure.

What is claimed is:

1. A laundry detergent sheet which is prepared by foaming raw materials consisting of, by weight percentage: 29-70% surfactant, 29-70% water and 1-40% additive, wherein the additive is selected from the group consisting of a fragrance raw material, a foaming agent, an enzyme preparation, an antibacterial agent, a thickener, a filler, and mixtures thereof; and wherein the laundry detergent sheet is in the form of a solid foamed structure having bubbles and Plateau channels between adjacent bubbles, wherein a volume proportion of the bubbles is 50-90%.

2. The laundry detergent sheet according to claim 1, wherein the volume proportion of the bubbles is 70-85%.

3. The laundry detergent sheet according to claim 2, wherein a diameter of each bubble is 10-1500 μm.

4. The laundry detergent sheet according to claim 1, wherein a curvature radius of each Plateau channel is 10-1500 μm.

5. The laundry detergent sheet according to claim 1, wherein the surfactant consists of: anionic surfactant, cationic surfactant, and nonionic surfactant.

6. The laundry detergent sheet according to claim 5, wherein by weight percentage, the surfactant consists of: 49-99% anionic surfactant, 0.01-5% cationic surfactant, and 0.01-50% nonionic surfactant.

7. The laundry detergent sheet according to claim 6, wherein by weight percentage, the raw materials consist of: 60% surfactant, 37% water and 3% additives; and the surfactant consists of, by weight percentage, 80% anionic surfactant, 1% cationic surfactant, and 19% nonionic surfactant.

8. A preparation method of laundry detergent sheet according to claim 1, the method comprising steps of: stirring additives and water to achieve a uniform mixture, and heating until completely dissolved; adding a surfactant, and stirring until completely dissolved; and foaming, measuring viscosity, and after the viscosity meets a requirement from 2000-30000 mPa·s at 40-85° C., drying and tableting to obtain the detergent sheet.

* * * * *